United States Patent
Baek et al.

(10) Patent No.: US 9,653,915 B2
(45) Date of Patent: May 16, 2017

(54) METHOD AND APPARATUS FOR DETECTING ELECTRO STATIC DISCHARGE IN ELECTRONIC DEVICE

(71) Applicant: Samsung Electronics Co., Ltd., Gyeonggi-do (KR)

(72) Inventors: Jong-Jin Baek, Gyeonggi-do (KR); Shin-Wung Bang, Gyeonggi-do (KR); Jong-Hyeok Youn, Gyeonggi-do (KR); Kwang-Woo Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 419 days.

(21) Appl. No.: 14/290,038

(22) Filed: May 29, 2014

(65) Prior Publication Data
US 2015/0070807 A1    Mar. 12, 2015

(30) Foreign Application Priority Data

Sep. 12, 2013    (KR) .................. 10-2013-0109572

(51) Int. Cl.
*H02H 9/00*    (2006.01)
*H02H 9/04*    (2006.01)

(52) U.S. Cl.
CPC .................. *H02H 9/046* (2013.01)

(58) Field of Classification Search
USPC .......................................... 361/86
See application file for complete search history.

(56) References Cited

U.S. PATENT DOCUMENTS

| | | | | |
|---|---|---|---|---|
| 4,293,730 A * | 10/1981 | Myers | ............... | H05B 3/0023 373/135 |
| 4,841,405 A * | 6/1989 | Udren | ............... | H02H 7/26 361/80 |
| 4,969,062 A * | 11/1990 | Barylak | ............... | H02H 9/025 361/42 |
| 5,835,327 A * | 11/1998 | Siew | ............... | G01R 27/18 361/111 |
| 6,414,600 B1 * | 7/2002 | Plukphongrat | ...... | G01R 31/024 340/649 |
| 6,555,934 B2 * | 4/2003 | Miller | ............... | H05K 9/0064 307/103 |
| 7,279,921 B1 * | 10/2007 | Iacob | ............... | G01R 31/31721 324/537 |
| 7,362,558 B2 * | 4/2008 | Romero Lobato | .. | H02H 11/002 361/100 |
| 2007/0285854 A1 * | 12/2007 | Rodgers | ............... | H02H 3/006 361/56 |
| 2008/0144243 A1 * | 6/2008 | Mariani | ............... | G01R 31/048 361/56 |
| 2010/0315754 A1 * | 12/2010 | Ker | ............... | H02H 9/046 361/111 |
| 2011/0121865 A1 * | 5/2011 | Olmos | ............... | H03K 19/00384 327/77 |

(Continued)

*Primary Examiner* — Ronald W Leja
(74) *Attorney, Agent, or Firm* — Cha & Reiter, LLC (57) ABSTRACT

A system detects Electro Static Discharge (ESD) of an electronic device by sensing a ground voltage of an electronic device, comparing the sensed ground voltage with a predetermined reference voltage and if the sensed ground voltage exceeds the reference voltage, performs at least one predetermined operation of the electronic device.

20 Claims, 5 Drawing Sheets

(56) References Cited

U.S. PATENT DOCUMENTS

| | | | |
|---|---|---|---|
| 2011/0122671 A1* | 5/2011 | May | G11C 5/143 365/94 |
| 2011/0129229 A1* | 6/2011 | Schemmann | H04B 10/807 398/137 |
| 2011/0291675 A1* | 12/2011 | Rallabandi | G01R 19/10 324/679 |
| 2013/0083437 A1 | 4/2013 | Huang | |
| 2014/0078624 A1* | 3/2014 | Nagamatsu | H01L 27/0285 361/18 |
| 2015/0070807 A1* | 3/2015 | Baek | H02H 9/046 361/86 |
| 2016/0238650 A1* | 8/2016 | Savich | H05F 3/02 |

* cited by examiner

METHOD AND APPARATUS FOR DETECTING ELECTRO STATIC DISCHARGE IN ELECTRONIC DEVICE

CLAIM OF PRIORITY

This application claims priority under 35 U.S.C. §119(a) to Korean Application Serial No. 10-2013-0109572 filed in the Korean Intellectual Property Office on Sep. 12, 2013, the entire content of which is hereby incorporated by reference.

BACKGROUND

1. Technical Field

The present disclosure concerns a system for detecting Electro Static Discharge (ESD) that may be generated in an electronic device.

2. Description of the Related Art

Electro Static Discharge (ESD) is a phenomenon in which charge movement occurs for a very short time (several hundreds of nsec) while or before an object electrically charged with charges of one polarity is contacted with an object electrically charged with charges of the other polarity. This ESD occurs due to separation of static charges and is frequently experienced in everyday life. For example, when nonconductors are rubbed against each other, movable charges are stored in the material, and here, an electric arc may be generated due to the electrical discharge and a direct conduction path formed. ESD occurs when an electrically charged conductor is near to another conductor.

The maximum voltage value of ESD occurring in an electronic device may be, for example, 35 kV or higher, and this ESD phenomenon may damage an electronic device or affect its performance.

SUMMARY

Known systems detect ESD using VGH voltage providing the output power of a Liquid Crystal Display (LCD). While an LCD is driven, fluctuation or dropping of power is measured to detect ESD. This known method is limited to being employed in restricted situations.

In order to solve the above problems and other problems, an aspect of the invention is to provide a system, which detects an occurrence of ESD, by sensing a ground (GND) voltage of an electronic device and comparing the sensed ground (GND) voltage with a reference voltage in response to a sudden potential difference generated at a ground position. An electronic device performs differential device control (e.g., performs a particular function, resets a particular part, or resets electronic device power) in response to detected ESD strength, by adjusting a reference voltage or a position of a sensor sensing a ground voltage, for example. The system adaptively controls sensitivity of detection of ESD by adjusting the reference voltage or changing the position of the ground sensor and uses one or more ground sensors and one or more reference voltages to generate different interrupts corresponding to different ESD strengths. The generated interrupts are used to reset hardware (H/W) or software (S/W) functions, thereby returning the electronic device to a normal state in various abnormal states which may occur at the time of occurrence of ESD.

A system detects Electro Static Discharge (ESD) of an electronic device by sensing a ground voltage of an electronic device, comparing the sensed ground voltage with a predetermined reference voltage and if the sensed ground voltage exceeds the reference voltage, performs at least one predetermined operation of the electronic device.

In a feature the system compares the sensed ground voltage with multiple different reference voltage levels, in response to comparing the sensed ground voltage with multiple different reference voltage levels, employs a map associating different sensed voltage levels with different operations in selecting an operation for performance and performs the selected operation. The ground voltage is sensed by a voltage applied to a resistor connected to a ground position of the electronic device and the at least one operation is at least one of a display reset operation, a camera preview reset operation, and an electronic device hardware reset operation.

In another feature, the system senses multiple ground voltages at multiple ground positions and compares the ground voltages respectively sensed at the ground positions with predetermined reference voltages. The reference voltages are set to different voltage values according to the respective ground positions with respect to the multiple sensed ground voltages. Further, if the reference voltages are set to different voltage values, the system compares the sensed ground voltage with multiple different reference voltage levels, employs a map associating different sensed voltage levels with different operations in selecting operations for performance and performs the selected operations.

In another feature, the reference voltages are set to the same voltage value for the respective ground positions with respect to the multiple sensed ground voltages. The system provides the sensed ground voltage to multiple comparators, compares the sensed ground voltage with respective reference voltages set by the comparators and performs at least one predetermined operation according to comparison results output from the comparators. Alternatively the reference voltages are set to different voltage values for the comparators and if the reference voltages are set to different voltage values, the system employs a map associating different sensed voltage levels with different operations in selecting operations for performance and performs the selected operations.

In yet another feature, an apparatus detecting ESD of an electronic device, using a ground sensor sensing a ground voltage of the electronic device. A comparator compares the sensed ground voltage with a predetermined reference voltage. A controller generates, if the sensed ground voltage exceeds the reference voltage, a control signal for performing at least one of predetermined operation of the electronic device. In response to comparing the sensed ground voltage with multiple different reference voltage levels, the controller employs a map associating different sensed voltage levels with different operations in selecting an operation for performance and initiates performance of the selected operation. Multiple sensors respectively at multiple ground positions sense multiple ground voltages and multiple comparators respectively connected with the ground sensors compare the ground voltages sensed from the ground sensors with predetermined reference voltages. The controller generates, if the reference voltages are set to different voltage values, control signals for performing different operations according to comparison results with the reference voltages and the controller employs a map associating different sensed voltage levels with different operations in selecting operations for performance and performs the selected operations.

According to invention principles, the occurrence of ESD can be detected in various situations without limitations to particular situations, by using the phenomenon that, when ESD occurs in the electronic device, a sudden potential difference is generated according to the ground position of the electronic device.

DETAILED DESCRIPTION

A system is described in detail with reference to the accompanying drawings and is intended to cover modifications, equivalents, or substitutions. While terms including ordinal numbers, such as "first" and "second," may be used to describe various components, such components are not limited by the above terms. The terms are used to distinguish an element from other elements. For example, a first element could be termed a second element, and similarly, a second element could be also termed a first element. As used herein, the term "and/or" includes combinations of one or more of the associated listed items. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, the terminologies used herein including technical or scientific terminologies have the same meaning as those understood by a person having an ordinary skill in the art. Terminologies as defined in a generally used dictionary should be interpreted to have the same meaning as those of the terminologies in context in the related descriptions, and shall not be interpreted in an ideal or excessively formal meaning unless they are explicitly defined herein.

A system detects Electro Static Discharge (ESD) of an electronic device by sensing ground (GND) voltages of the electronic device and comparing the sensed ground voltages with at least one reference voltage to detect occurrence of ESD. The occurrence of ESD is detected in different situations in response to potential difference being generated at a ground position within the electronic device. The system controls the sensitivity of detection of ESD by dynamically and adaptively adjusting a reference voltage used for comparison with the ground voltage and by changing a position of a ground voltage sensor. In an embodiment, multiple ground sensors and reference voltages are used to generate different interrupt signals corresponding to different ESD strengths, enabling the system to adaptively respond to ESD in different situations and address corresponding different problems associated with different detected ESD strengths. For example, the interrupt signals generated are used to reset hardware (H/W) or software (S/W) functions, thereby returning the electronic device to a normal state in different abnormal situations that may occur at the time of occurrence of ESD. For example, different problems may be generated as a result of different strengths of ESD sensed at the ground positions of the electronic device and the system dynamically, adaptively adjusts ESD detection sensitivity using respective detection channels and multiple comparators, to address different problems according to detected ESD strength.

Hereinafter, embodiments will be described in detail with reference to the accompanying drawings so that those skilled in the art can easily carry out the embodiments.

Figure 1:
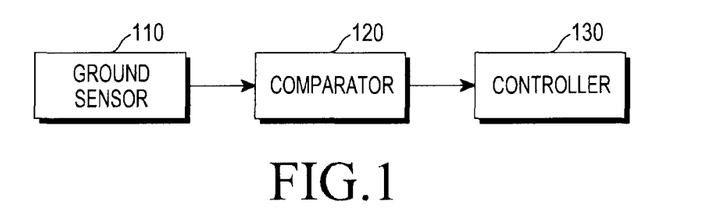
FIG. 1 shows an apparatus for detecting ESD according to invention principles.

FIG. 1 shows an apparatus for detecting ESD including a ground sensor 110, a comparator 120, and a controller 130. The ground sensor 110 may be disposed in any portion of the electronic device. For example, the ground sensor 110 may comprise one or more ground sensors disposed at different locations including at a position at which frequent occurrence or inrush of ESD is expected or on the electronic device housing itself. The ground sensor 110 may be implemented in different ways. For example, the ground sensor 110 may be implemented by providing at least one part between the comparator 120 and a ground portion at a position at which a ground voltage is to be measured in the electronic device. For example, the ground sensor 110 may be implemented by providing a resistor between the ground portion and the comparator 120. The comparator 120 may compare the voltage sensed by the ground sensor 110 with a predetermined reference voltage ($V_{th}$) and in response to the sensed voltage exceeding the reference voltage, detects ESD occurrence.

For example, when ESD occurs at a ground position at which the ground sensor 110 is disposed, a sudden potential difference may be generated between the reference voltage and the sensed voltage. For this reason, the voltage difference between the reference voltage and the sensed voltage may be changed from 'positive (+)' to 'negative (−)' and returned to an original state in the comparator 120. In addition, according to another embodiment, the voltage difference between the reference voltage and the sensed voltage may be changed from 'negative (−)' to 'positive (+)' and returned to the original state in the comparator 120.

When the voltage difference between the reference voltage and the sensed voltage is changed in the comparator 120, the comparator 120 may be operated to output an interrupt signal while the output stage is changed in a manner of "Low->High->Low" or "High->Low->High". The comparator 120 may generate the interrupt signal when the voltage sensed by the ground sensor 110 exceeds the reference voltage. The controller 130 may receive the interrupt signal from the comparator 120 and control the electronic device to perform a predetermined operation (e.g., resetting software or hardware of the electronic device) in response to the received interrupt signal. For example, when the comparator 120 is implemented using a particular device such as the device shown in FIG. 7, the controller 130 may be operated by sensing a rising edge, a falling edge, a low or high signal from the interrupt signal output of comparator 120. Controller 130 may monitor the signal of the comparator 120 by using, for example, General Purpose Input and Output (GPIO) pins and when the signal from the comparator 120 changes state, a predetermined software or hardware reset operation may be performed in accordance with a predetermined ESD operation table.

Figure 2:
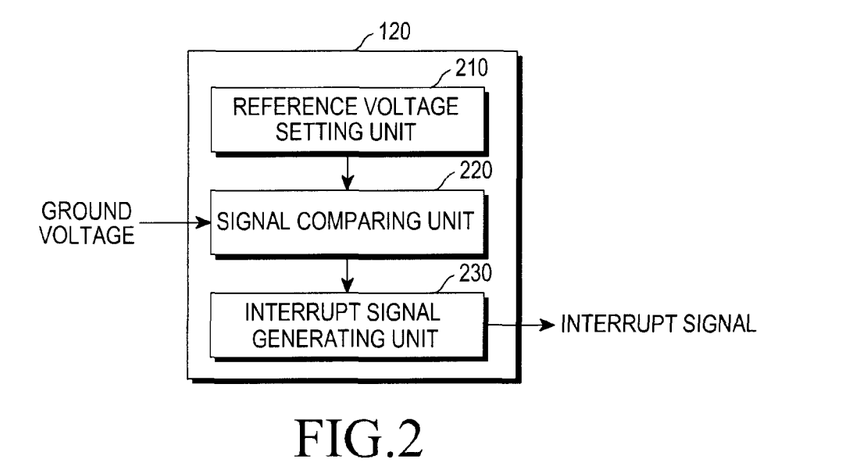
FIG. 2 shows a structure of a comparator according to invention principles.

FIG. 2 shows a detailed structure of comparator 120 including a reference voltage setting unit 210, a signal comparing unit 220, and an interrupt signal generating unit 230. The reference voltage setting unit 210 comprises a reference voltage used for determining whether ESD occurs, and may be configured in software, or may be configured in electronic circuitry using at least one electronic part element. In addition, the reference voltage setting unit 210 may be advantageously adaptively variable. The signal comparing unit 220 may compare the ground voltage sensed by the ground sensor 110 with the reference voltage set by the reference voltage setting unit 210 and when ESD is determined to occur at a ground location, the interrupt signal generating unit 230 may generate and output an interrupt signal to the controller 130. Comparator 120 may be configured in whole or in part as software or hardware and at least a part of the comparator 120 may be omitted.

Figure 3:
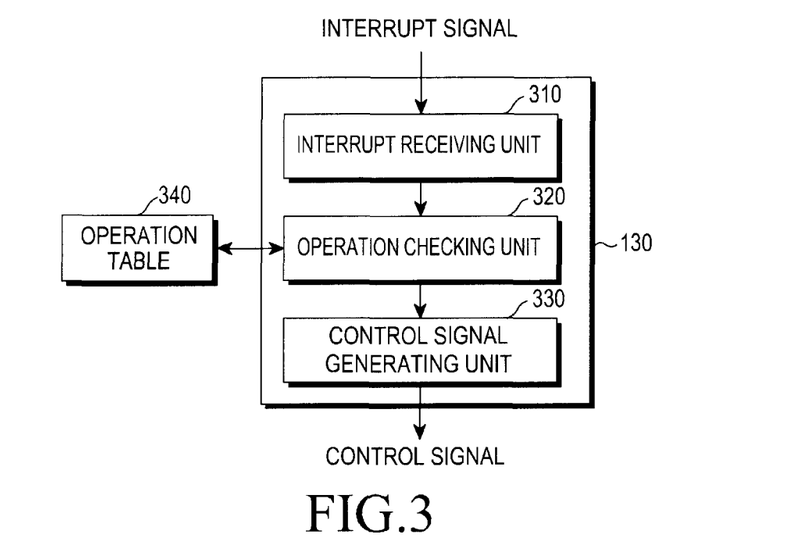
FIG. 3 shows a structure of a controller according to invention principles.

FIG. 3 shows a detailed structure of controller 130 including an interrupt receiving unit 310, an operation checking unit 320, and a control signal generating unit 330. The interrupt receiving unit 310 may receive an interrupt signal output from the comparator 120. The operation checking unit 320 may check at least one predetermined operation corresponding to the received interrupt signal with reference to an operation lookup table 340. For example, the operation lookup table 340 may comprise Table 1.

TABLE 1

| Comparator configuration | ESD recognition strength | Operation | Note |
| --- | --- | --- | --- |
| First stage | 8 kV~12 kV | Resetting LCD | |
| Second stage | 12 kV~15 kV | Resetting camera preview | |
| Third stage | 15 kV or higher | Resetting hardware (rebooting) | |

Referring to the operation table 340, the control signal generating unit 330 may generate and output a control signal to perform at least one predetermined operation (such as resetting a display (e.g., an LCD), resetting a camera preview, resetting hardware) in response to the detected range of the sensed ESD strength. In Table 1, a hardware reset operation is performed when the first stage, second stage and the third stage of the comparator detect ESD. An LCD reset operation is performed when the first stage is activated and an LCD reset operation as well as a camera preview reset operation are performed when the second stage is activated. Multiple interrupt signals are received from multiple comparators 120 or different types or different voltages of interrupt signals may be received from one comparator 120. The system employs a lookup table map associating different types of interrupt signals (and corresponding different detected ESD voltage levels) output by comparator 120 with different operations.

Figure 5:
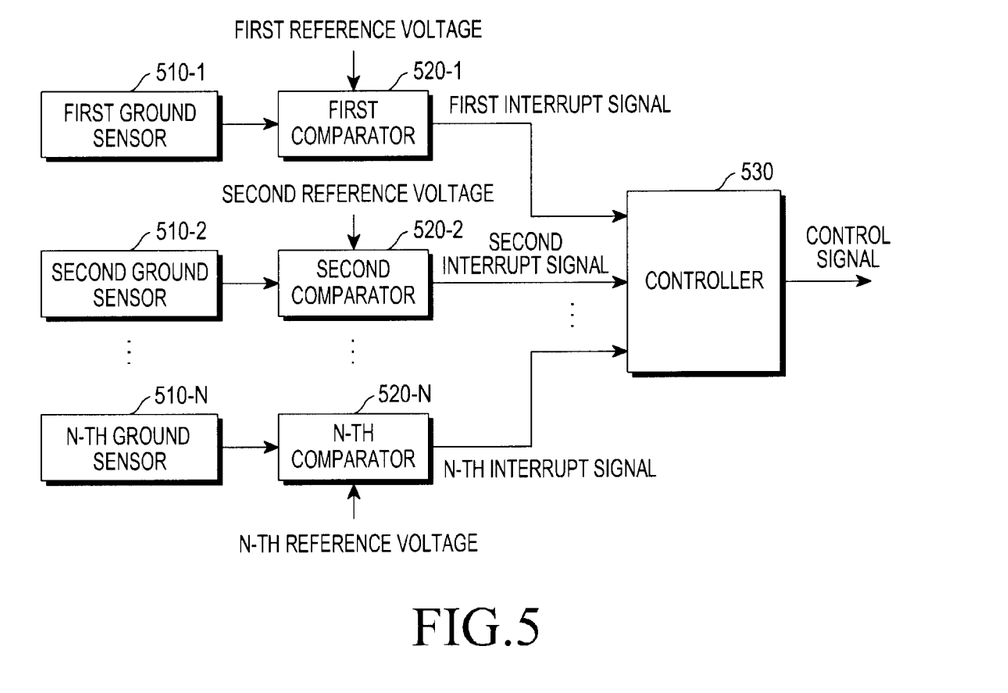
FIG. 5 shows an apparatus for detecting ESD according to invention principles.
Figure 6:
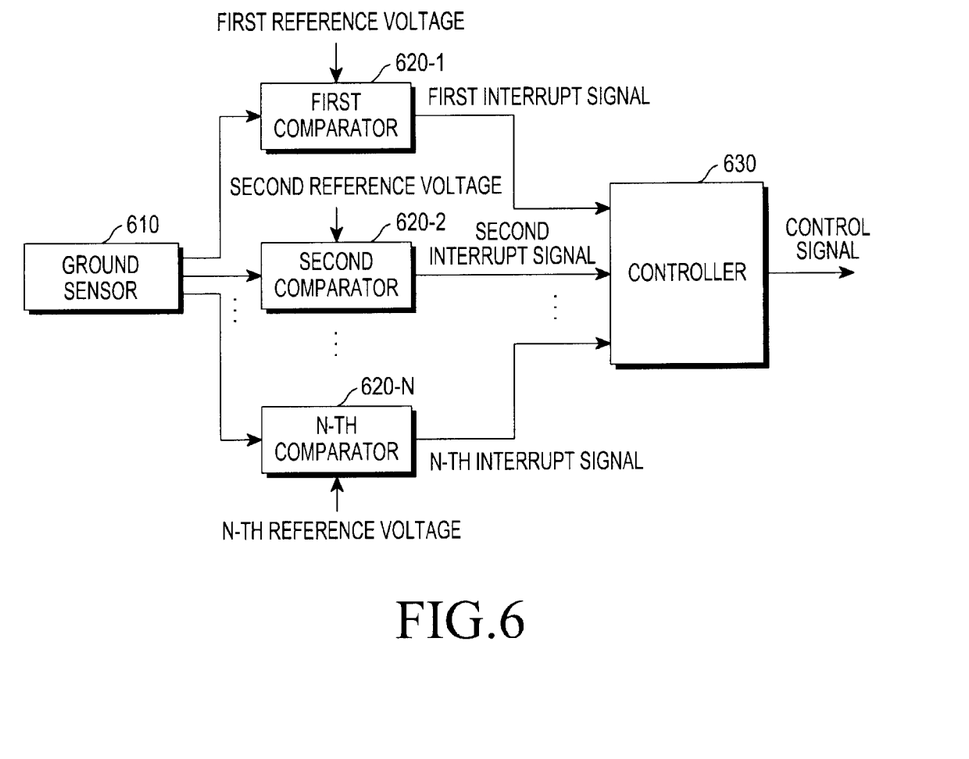
FIG. 6 shows an apparatus for detecting ESD according to invention principles.

In another embodiment shown in FIGS. 5 and 6, multiple comparators are provided and different reference voltages are respectively set for the comparators. When the ground voltage at a particular location exceeds a particular reference voltage, the comparators output interrupt signals and the controller determines which comparator of the multiple comparators output an interrupt signal and uses the lookup table to identify and to perform one or more respective different operations. Respective components of the device (e.g., electronic device or apparatus for detecting ESD) are shown in separate drawings so that they are functionally and logically separable, but it does not mean that the components are physically separate or are implemented as separate code segments. Further, each function unit may refer to a functional or structural combination of hardware for realizing the system and software for driving the hardware. For example, each function unit may refer to a logical segment of predetermined code or a hardware resource for executing the predetermine code, and a function unit may not comprise physically connected code or a particular type of hardware. For example, functional components of FIG. 1 to FIG. 3 may be configured in whole or in part as software and/or hardware.

Figure 4:
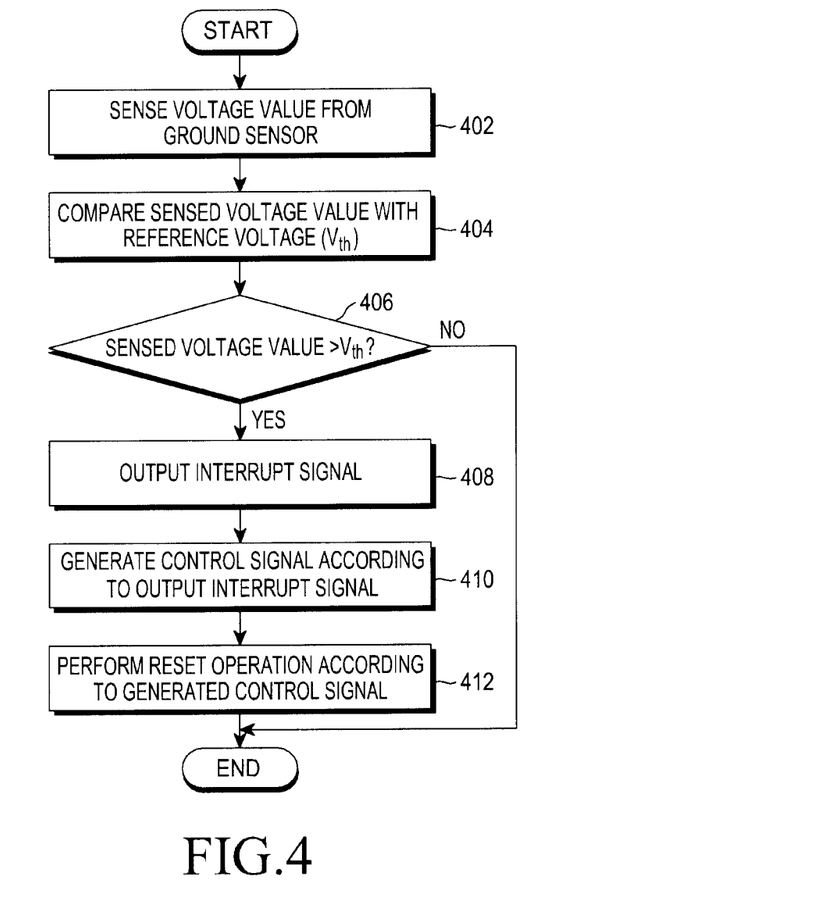
FIG. 4 shows a flowchart of a method for detecting ESD according to invention principles.

FIG. 4 shows a flowchart of a method for detecting ESD. An occurrence of ESD may be detected by sensing a voltage value from the ground sensor (402). The sensed voltage value is compared with a reference voltage ($V_{th}$) (404). If the sensed voltage value exceeds the reference voltage ($V_{th}$) (406-Y), the comparator may output an interrupt signal (408). The controller may generate a control signal in response to the output interrupt signal (410), and may perform a corresponding operation (e.g., resetting software, resetting hardware) in response to the generated control signal (412). Methods for detecting ESD may be implemented in executable program instructions that can be performed on different computer platforms, and may be stored on a computer-readable medium. The computer-readable storage medium may include program instructions, data files and data. Examples of the computer-readable storage medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory. Examples of program instructions include a machine language code generated by a compiler and a high-level language code that a computer can execute by using an interpreter for example. The hardware devices may be configured to operate as at least one software module to perform the operations of the present disclosure, and vice versa.

FIG. 5 shows an apparatus for detecting ESD including multiple ground sensors 510-1, 510-2, . . . , 510-N and multiple comparators 520-1, 520-2, . . . , 520-N. The multiple ground sensors 510-1, 510-2, . . . , 510-N may be provided at respective positions at which ground voltages of the electronic device are to be measured. For example, the respective ground sensors 510-1, 510-2, . . . , 510-N may be disposed at multiple different positions at which frequent occurrence or inrush of ESD is predicted. For example, a ground voltage sensed through a first ground sensor 510-1 may be input to a first comparator 520-1 and compared with a first reference voltage. The first comparator 520-1 may output a first interrupt signal as the comparison result and then provide it to the controller 530. In addition, a ground voltage sensed through a second ground sensor 510-2 may be input to a second comparator 520-2 and then compared with a second reference voltage. The second comparator 520-2 may output a second interrupt signal as the comparison result and then provide it to the controller 530. In the same manner, a ground voltage sensed through an N-th ground sensor 510-N may be input to an N-th comparator 520-N and then compared with an N-th reference voltage. The N-th comparator 520-N may output an N-th interrupt signal as the comparison result and then provide it to the controller 530. Respective reference voltages used for comparison by the respective comparators 520 may be adaptively and dynamically set to the same voltage value or different voltage values. For example, when the reference voltages are set to the same voltage value, the ground voltages sensed at multiple different positions are compared with the same reference voltage value. As the comparison result, when an interrupt signal is generated from at least one comparator, the controller 530 may output a control signal to perform a corresponding operation.

In addition, when the reference voltages are set to different voltage values, if interrupt signals are generated from one or more comparators as the comparison result, the controller 530 may distinguish the interrupt signals output from the respective comparators 520 from each other and generate control signals to perform operations corresponding to respective interrupt signals. For example, as shown in Table 1, a control signal for resetting the LCD may be output when a first interrupt signal output through the first comparator 520-1 is input to the controller 530. A control signal for resetting the camera preview may be output when a second interrupt signal output through the second comparator 520-2 is input to the controller 530 and a control signal for resetting and rebooting hardware may be output when a third interrupt signal output through the third comparator 520-3 is input to the controller 530.

FIG. 6 shows an apparatus for detecting ESD including multiple comparators 620-1, 620-2, ..., 620-N connected in parallel with one ground sensor 610 for detecting occurrence of ESD with respect to a single ground position using multiple reference voltages, for initiating different operations in response to different detected ESD voltages. The ground sensor 610 may be provided at a particular position such as a position at which frequent occurrence or inrush of ESD is expected. For example, the ground voltage sensed through the ground sensor 610 is input to the first comparator 620-1 to the N-th comparator 620-N and then compared with the first reference voltage to the N-th reference voltage.

Figure 7:
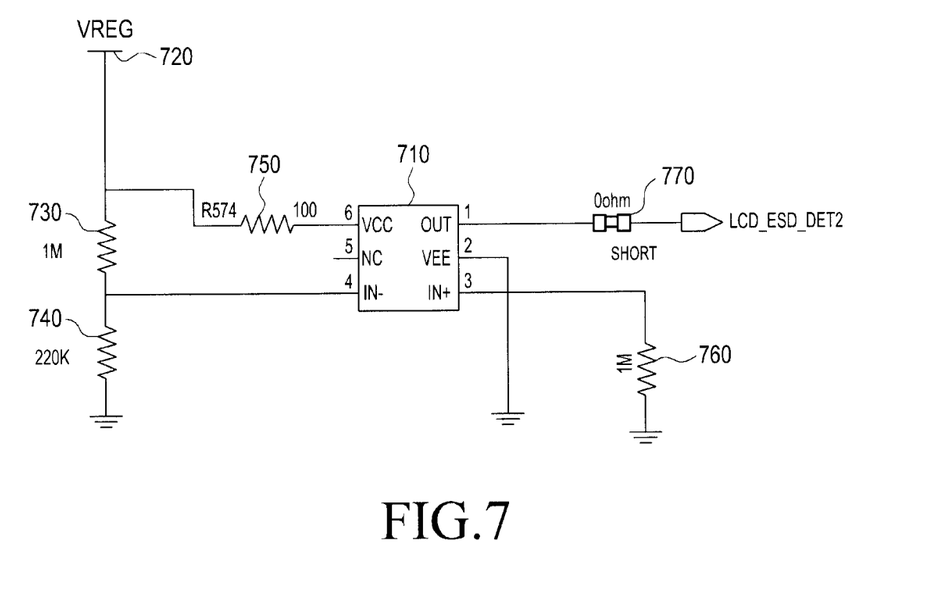
FIG. 7 shows a circuit for detecting ESD according to invention principles.

The first comparator 620-1 may output a first interrupt signal as the result of comparison between the ground voltage by the ground sensor 610 and the first reference voltage, and then provide the first interrupt signal to the controller 630. In addition, the second comparator 620-2 may output a second interrupt signal as the result of comparison between the ground voltage by the ground sensor 610 and the second reference voltage, and then provide the second interrupt signal to the controller 630. In addition, the N-th comparator 620-N may output an N-th interrupt signal as the result of comparison between the ground voltage of the ground sensor 610 and the N-th reference voltage, and then provide the N-th reference voltage to the controller 630. Respective reference voltages used for comparison by the respective comparators 620 may be set to different voltage values as shown in Table 1. Different operations are performed by comparing the ground voltage sensed at the same position of the electronic device with the multiple reference voltages. FIG. 7 shows a circuit for detecting ESD including a comparator 710 and multiple resistors 730 to 770. The comparator 710 may be a predetermined IC chip outputting an interrupt signal depending on a difference between the input ground voltage and the reference voltage. For example, a voltage VREG 720 is input to a VCC input terminal (e.g., pin number 6) of a comparator 710 via a third resistor 750 to supply a driving voltage to the comparator 710. In addition, the voltage VREG 720 is voltage-divided by a first resistor 730 and a second resistor 740, and the divided voltage potential is input to an IN− input terminal (e.g., pin number 4) of the comparator 710. A VEE terminal (e.g., pin number 2) of the comparator 710 is connected to a ground (GND). In addition, an IN+ terminal (e.g., pin number 3) of the comparator 710 is a ground sensor connected to a ground position, at which a ground voltage of the electronic device is to be sensed, via a fourth resistor 760.

The comparator 710 compares the voltage-divided reference voltage ($V_{th}$) input through the IN− terminal with the ground voltage input through the IN+ terminal, which is connected to the ground position in order to detect the ESD, and outputs an interrupt signal as the comparison result through an OUT terminal (e.g., pin number 1) of the comparator 710. The interrupt signal output through the OUT terminal may be input to the controller 630 as described above, to output a control signal or provide a control signal directly to the control circuit. The sensitivity of detection of occurrence of ESD may be advantageously controlled by different methods. For example, the sensitivity of detection thereof may be controlled by adjusting the resistance value of the resistor included in the ground sensor. The larger the resistance value of the resistor included in the ground sensor, the smaller the ESD strength that is sensitively detected. Whereas, the smaller the resistance value thereof, the larger the ESD strength detectable. In addition, the intensity in detection may be controlled by adjusting the position of the resistor of the ground sensor. For example, the reaction to ESD may be more sensitive by disposing the resistor at a position at which the flow or inrush of ESD is expected.

In addition, as described above, the sensitivity of detection may be controlled by adjusting the reference voltage value of the comparator. For example, the lower the reference voltage value, the more sensitive the reaction to ESD, and the higher the reference voltage value, the larger the ESD strength that is detected. The controller may be implemented in hardware or software, and may be implemented in a Central Processing Unit (CPU). For example, the controller may monitor the signal of the comparator by using GPIO pins (including an interrupt/wake-up pin). In addition, the controller may perform a software or hardware reset operation to fit the above-described ESD operation table (e.g., Table 1) when the signal of the comparator is changed. The controller may be operated by sensing a rising edge or falling edge or sensing a low or high signal input voltage level value change from the comparator. The system is not limited to the described embodiments. Different modifications and changes may be made by those skilled in the art from the description. The claims which will be described below but also their equivalents fall within the spirit and scope of the present invention.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

What is claimed is:

1. A method for detecting Electro Static Discharge (ESD) of an electronic device, the method comprising:
   sensing, by a ground sensor, a ground voltage of an electronic device;
   comparing, by a comparator, the sensed ground voltage with a predetermined reference voltage;
   when the sensed ground voltage exceeds the reference voltage, generating by the comparator, and interrupt signal in response to an occurrence of ESD;
   receiving, by a controller, the interrupt signal;
   performing at least one predetermined operation of the electronic device associated with the interrupt signal;
   adjusting a resistance value of a resistor included in the ground sensor for controlling a sensitivity of detection of the ground sensor, and
   adjusting a reference voltage value of the comparator for controlling a sensitivity of detection of the ground sensor.

2. The method of claim 1, including
   comparing the sensed ground voltage with multiple different reference voltage levels,
   in response to comparing the sensed ground voltage with multiple different reference voltage levels, employing a map associating different sensed voltage levels with different operations in selecting an operation for performance; and
   performing the selected operation.

3. The method of claim 1, wherein in the sensing of the ground voltage, the ground voltage is sensed by a voltage applied to a resistor connected to a ground position of the electronic device and the at least one operation is at least one of a display reset operation, a camera preview reset operation, and an electronic device hardware reset operation.

4. The method of claim 1, wherein the method comprises:
   sensing multiple ground voltages at multiple ground positions; and
   comparing the ground voltages respectively sensed at the ground positions with predetermined reference voltages.

5. The method of claim 4, wherein the reference voltages are set to different voltage values according to the respective ground positions with respect to the multiple sensed ground voltages.

6. The method of claim 5, further comprising, when the reference voltages are set to different voltage values,
   comparing the sensed ground voltage with multiple different reference voltage levels,
   employing a map associating different sensed voltage levels with different operations in selecting operations for performance and
   performing the selected operations.

7. The method of claim 4, wherein the reference voltages are set to the same voltage value for the respectively sensed ground positions with respect to the multiple sensed ground voltages.

8. The method of claim 1, wherein the method comprises:
   providing the sensed ground voltage to multiple comparators;
   comparing the sensed ground voltage with respective reference voltages set by the comparators; and
   performing at least one predetermined operation according to comparison results output from the comparators.

9. The method of claim 8, wherein the reference voltages are set to different voltage values for the comparators.

10. The method of claim 9, further comprising, when the reference voltages are set to different voltage values,
    employing a map associating different sensed voltage levels with different operations in selecting operations for performance and
    performing the selected operations.

11. An apparatus for detecting ESD of an electronic device, the apparatus comprising:
    a ground sensor sensing a ground voltage of an electronic device;
    a comparator comparing the sensed ground voltage with a predetermined reference voltage and generating, when the sensed ground voltage exceeds the reference voltage, an interrupt signal in response to an occurrence of ESD; and
    a controller receiving the interrupt signal, generating a control signal for performing at least one of predetermined operation of the electronic device associated with the interrupt signal, adjusting a resistance value of resistor included in the ground sensor for controlling a sensitivity of detection of the ground sensor and adjusting a reference voltage value of the comparator for controlling a sensitivity of detection of the ground sensor.

12. The apparatus of claim 11, wherein the comparator compares the sensed ground voltage with multiple different reference voltage levels,
    in response to comparing the sensed ground voltage with multiple different reference voltage levels, the controller employs a map associating different sensed voltage levels with different operations in selecting an operation for performance and initiates performance of the selected operation.

13. The apparatus of claim 11, wherein the ground sensor senses the ground voltage by a voltage applied to a resistor connected to a ground position of the electronic device and the at least one operation is at least one of a display reset operation, a camera preview reset operation, and an electronic device hardware reset operation.

14. The apparatus of claim 11, wherein the apparatus comprises:
    multiple ground sensors respectively provided at multiple ground positions to sense multiple ground voltages; and
    multiple comparators respectively connected with the multiple ground sensors to compare sensed ground voltages from the multiple ground sensors with predetermined reference voltages.

15. The apparatus of claim 14, wherein the reference voltages are set to different voltage values according to the ground positions with respect to the multiple sensed ground voltages.

16. The apparatus of claim 15, wherein the controller generates, if the reference voltages are set to different voltage values, control signals for performing different operations according to comparison results with the reference voltages and the controller employs a map associating different sensed voltage levels with different operations in selecting operations for performance and performs the selected operations.

17. The apparatus of claim 14, wherein the reference voltages are set to the same voltage value for respective ground positions with respect to the multiple sensed ground voltages.

18. The apparatus of claim 11, further comprising multiple comparators comparing sensed ground voltages from multiple ground sensors with predetermined reference voltages.

19. The apparatus of claim 18, wherein the reference voltages are set to different voltage values for the comparators.

20. The apparatus of claim 19, wherein the controller, when the reference voltages are set to different voltage values, employs a map associating different sensed voltage levels with different operations in selecting operations for performance and initiates performance of the selected operations.

\* \* \* \* \*